United States Patent Office 3,130,196
Patented Apr. 21, 1964

3,130,196
SULPHONAMIDES
Ernst Jucker, Binningen, Basel-Land, and Adolf J. Lindenmann, Basel, Switzerland, assignors to Sandoz Ltd. (also known as Sandoz A.G.), Basel, Switzerland, a Swiss firm
No Drawing. Original application May 8, 1961, Ser. No. 108,308. Divided and this application Apr. 30, 1962, Ser. No. 191,320
6 Claims. (Cl. 260—287)

The present application is a division of our copending application Serial No. 108,308, filed May 8, 1961.

The present invention relates to new sulphonamides having the structural Formula I,

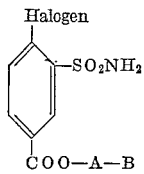

wherein A represents methylene and ethylene and B is selected from the group consisting of nitrogen, oxygen and can also represent a sulphur-containing heterocyclic group linked with one of its carbon atoms to the radical A, their acid addition salts and pharmaceutical compositions containing, in addition to an inert carrier, a compound I and/or an acid addition salt thereof.

The sulphonamides of this invention and their acid addition salts can be prepared by reacting a compound of the general Formula II,

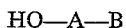

wherein A and B have the above significance, with a 3-sulphamyl-4-halogenobenzoyl chloride, and when an acid addition salt is required, salifying with an organic or inorganic acid.

Suitable meanings for the radical B are, for example, a 2- or 3-furyl or tetrahydrofuryl group, a 2-, 3- or 4-pyridyl or -piperidyl group, a 2-, 3- or 4-tetrahydropyranyl group, a 2-, 3- or 4-quinolyl group or a 2- or 3-thienyl group.

The preparation of the new sulponamides can be carried out as follows: a suspension of 3-sulphamyl-4-chlorobenzoyl chloride is mixed with a compound II until complete dissolution has taken place. The excess of the compound II is removed by evaporation in a vacuum. The resulting oily residue is then rubbed to crystallise out the required ester which is then purified.

The compounds of the invention, which are at room temperature solid crystalline compounds, have interesting pharmacodynamic properties and/or may be used as intermediate compounds for the production of pharmaceuticals. The exemplified compounds show, depending upon the nature of the radical A and B in Formula I diuretic, sodium uretic and chloride uretic properties. In tests with dogs they have been found to be effective on peroral administration; for example 3-sulphamyl-4-chlorobenzoic acid-tetrahydrofurfuryl ester has been found to be a particularly quick acting salidiureticum when administered to dogs perorally. 0.5 mg./kg. given to dogs perorally has more than doubled excretion of electrolyte after 2 hours.

The compounds can be administered in therapeutic dosages in conventional vehicles as in the form of a tablet as these compounds are effective upon oral administartion as well as upon injection.

Examples of suitable acids for salifying the compounds I are as follows: hydrochloric, hydrobromic, sulphuric, oxalic, tartaric, acetic and methanesulphonic acid.

The preparation of these compounds is more fully described in the following examples. It is to be understood, however, that the examples are illustrative of the compounds embraced by this invention and are not to be construed as limiting the invention to the particular compounds specifically described. All temperatures are stated in degrees centigrade.

EXAMPLE 1

*3 - Sulphamyl - 4 - Chloro - Benzoic Acid Pyridyl-(2')-Methyl Ester*

A suspension of 7.5 g. of 3-sulphamyl-4-chlorobenzoyl chloride, 3.5 g. of pyridyl-2-carbinol and 3.5 g. of triethylamine in 20 cc. of benzene is refluxed at 80° for 2 hours while being stirred, and for a short while complete solution occurs. Stirring of the reaction mixture is continued at room temperature for another 16 hours. The precipitate formed is filtered off. For removing the triethylamine hydrochloride the filtration residue is triturated in water and chloroform and the undissolved portion, i.e. the 3-sulphamyl-4-chloro-benzoic acid pyridyl-(2')-methyl ester, is dried. After recrystallization from methanol/petroleum ether the sulphonamide derivative melts at 170–171°.

EXAMPLE 2

*3-Sulphamyl-4-Chloro-Benzoic Acid Pyridyl-(3')-Methyl Ester*

A suspension of 7.5 g. of 3-sulphamyl-4-chloro-benzoyl chloride, 3.5 g. of pyridyl-3-carbinol and 3.5 g. of triethylamine in 20 cc. of benzene is refluxed for two hours at 80°, and after a short while complete solution occurs. Stirring of the reaction mixture is continued at room temperature for another 12 hours. The separated precipitate is filtered off, the filtration residue, i.e. the 3-sulphamyl-4-chloro-benzoic acid pyridyl-(3')-methyl ester, is thoroughly washed with water and benzene and then dried. After recrystallization from ethanol/petroleum ether the sulphonamide derivative melts at 189–190°.

EXAMPLE 3

*3-Sulphamyl-4-Chloro-Benzoic Acid Pyridyl-(4')-Methyl Ester*

A suspension of 6.0 g. of 3-sulphamyl-4-chloro-benzoyl chloride, 2.8 g. of pyridyl-4-carbinol and 2.8 g. of triethylamine in 40 cc. of benzene is refluxed at 80° for 2 hours while being stirred, stirring being thereafter continued at room temperature for another 17 hours. The benzene is then decanted and the solid greasy portion triturated in a mixture of acetone and water to remove the triethylamine hydrochloride. The mixture is filtered and, after having been briefly dried in a vacuum, the filtration residue is recrystallized from methanol. The 3-sulphamyl-4-chloro-benzoic acid pyridyl-(4')-methyl ester melts at 184–185°.

EXAMPLE 4

*3-Sulphamyl-4-Chloro-Benzoic Acid Quinolyl-(4')-Methyl Ester*

A suspension of 4.0 g. of quinolyl-4-carbinol and 7.5 g. of 3-sulphamyl-4-chloro-benzoyl chloride in 50 cc. of benzene is stirred for 6 days while at a temperature of 20 to 25°. The reaction mixture is then filtered, the filtration residue being washed with water and dried in a vacuum for 15 hours. After recrystallization from methanol the 3 - sulphamyl - 4-chloro-benzoic-acid-quinolyl-(4')-methyl ester hydrochloride melts at 244–245° (decomp.).

EXAMPLE 5

*3-Sulphamyl-4-Chloro-Benzoic Acid Quinolyl-(2')-Methyl Ester*

7.5 g. of 3-sulphamyl-4-chloro-benzoyl chloride are added portionwise to a stirred mixture of 4.8 g. of quinoline-2-carbinol and 3.0 g. of triethylamine in 50 cc. of benzene, stirring being thereafter continued at 20–25° for another 140 hours and 50 cc. of chloroform added in two portions for dissolving the hard mass that is formed. The reaction mixture is then evaporated in a vacuum until dry and the residue divided between 300 cc. of acetic acid ethyl ester and 200 cc. of water. After a little undissolved substance has been filtered off and the layers separated, the organic phase is dried over magnesium sulphate, the acetic acid ethyl ester being distilled off in a vacuum and the residue, i.e. the 3-sulphamyl-4-chlorobenzoic acid quinolyl-(2')-methyl ester, crystallized from methanol. After having been purified with animal charcoal and twice recrystallized from methanol the sulphonamide derivative melts at 189–191°.

We claim:
1. A member selected from the class consisting of a sulphonamide of the formula

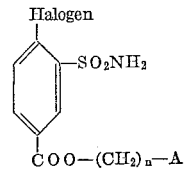

wherein A is a radical selected from the class consisting of 2-pyridyl, 3-pyridyl, 4-pyridyl, 2-quinolyl, 3-quinolyl and 4-quinolyl, and $n$ represents one of the whole numbers 1 to 2 inclusive, and the acid addition salts of said sulphonamide, with an acid selected from the group consisting of hydrochloric, hydrobromic, sulphuric, oxalic, tartaric, acetic and methanesulphonic acid.

2. 3-sulphamyl-4-chlorobenzoic acid pyridyl-(2')-methyl ester.

3. 3-sulphamyl-4-chlorobenzoic acid pyridyl-(3')-methyl ester.

4. 3-sulphamyl-4-chlorobenzoic acid quinolyl-(4')-methyl ester.

5. 3 - sulphamyl - 4 - chlorobenzoic acid quinolyl-(2')-methyl ester.

6. 3 - sulphamyl - 4 - chlorobenzoic acid pyridyl-(4')-methyl ester.

No references cited.